(12) United States Patent
Nakajo et al.

(10) Patent No.: US 8,908,247 B2
(45) Date of Patent: Dec. 9, 2014

(54) IMAGE CREATION DEVICE, TRANSMITTING DEVICE, IMAGE-TRANSMITTING SYSTEM, AND PROGRAM USED IN SAME

(75) Inventors: Shoichi Nakajo, Matsumoto (JP); Kenichi Yoshimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 366 days.

(21) Appl. No.: 13/106,956

(22) Filed: May 13, 2011

(65) Prior Publication Data

US 2011/0279877 A1 Nov. 17, 2011

(30) Foreign Application Priority Data

May 14, 2010 (JP) ................................. 2010-112075

(51) Int. Cl.
*H04N 1/46* (2006.01)
*H04N 1/411* (2006.01)
*H04N 1/64* (2006.01)

(52) U.S. Cl.
CPC ................ *H04N 1/411* (2013.01); *H04N 1/64* (2013.01); *H04N 2201/0094* (2013.01)
USPC ....... 358/540; 358/426.01; 358/448; 358/539

(58) Field of Classification Search
None
See application file for complete search history.

(56) References Cited

U.S. PATENT DOCUMENTS

| 6,144,763 | A | * | 11/2000 | Ito .................................. 382/166 |
| 2007/0018995 | A1 | * | 1/2007 | Koyanagi et al. ............. 345/589 |
| 2009/0153924 | A1 | * | 6/2009 | Frei ................................ 358/505 |
| 2009/0244607 | A1 | * | 10/2009 | Sako ............................ 358/1.15 |
| 2010/0091312 | A1 | * | 4/2010 | Edwards et al. ............. 358/1.13 |

FOREIGN PATENT DOCUMENTS

| JP | 2000-113160 A | | 4/2000 | |
| JP | 2000113160 A | * | 4/2000 | ............... G06T 1/00 |
| JP | 2004-072166 A | | 3/2004 | |
| JP | 2004072166 A | * | 3/2004 | ............... H04N 1/46 |
| JP | 2009-272755 A | | 11/2009 | |

* cited by examiner

*Primary Examiner* — Tammy Pham
*Assistant Examiner* — Keara Harris
(74) *Attorney, Agent, or Firm* — Global IP Counselors, LLP

(57) ABSTRACT

Color image data composed of pixels arranged in a matrix wherein colors are expressed in bit rows is created from an acquired document file, and same-resolution binary image data and low-resolution binary image data composed of binary pixels arranged in a matrix are created based on the color image data. A first combining process is performed in which a lower bit value of a predetermined color of the pixels of the color image data is replaced with the value of the corresponding ones of the pixels of the same pixels, and a second combining process is performed in which a lower bit value of a color other than the bit replaced in the first combining process in the pixels of the first combined image data is replaced with the value of the corresponding ones of the pixels of the low-resolution binary image data.

10 Claims, 7 Drawing Sheets

IMAGE CREATION DEVICE, TRANSMITTING DEVICE, IMAGE-TRANSMITTING SYSTEM, AND PROGRAM USED IN SAME

CROSS-REFERENCE TO RELATED APPLICATIONS

This application claims priority to Japanese Patent Application No. 2010-112075 filed on May 14, 2010. The entire disclosure of Japanese Patent Application No. 2010-112075 is hereby incorporated herein by reference.

BACKGROUND

1. Technical Field

The present invention relates to an image creation device, a transmitting device, an image-transmitting system, and a program used in the same.

2. Related Art

There are known in the art composite transfer (copy) devices which create and store both color image information and white/black binary image information from a manuscript, and transmit either the color image information or the binary image information depending on whether or not the facility where the image is to be transmitted is capable of receiving color images (see Japanese Laid-Open Patent Application No. 2004-72166, for example).

SUMMARY

With the device disclosed in Japanese Laid-Open Patent Application No. 2004-72166, appropriate image data can be transmitted depending on whether or not the facility is capable of receiving color images, but two types of image data, which are the color image and the binary image created from one manuscript, must be stored. Therefore, a problem is encountered in that the amount of image data increases.

The present invention was devised in view of the problem described above, and an object thereof is to provide combined image data including both color image data and binary image data with the same capacity as color image data.

The present invention employs the following means in order to achieve the primary object described above.

An image creation device according to a first aspect includes a binary image data creation unit and a combined image data creation unit. The binary image data creation unit is configured to create binary image data made of binary pixels based on color image data made of a plurality of pixels, with a color of each of the pixels of the color image data being expressed in a bit row. The combined image data creation unit is configured to use a value of each of the binary pixels of the binary image data to replace a value of a predetermined bit of a corresponding one of the pixels of the color image data to create combined image data in which the binary image data is combined with the color image data.

With this image creation device, binary image data composed of binary pixels arranged in a matrix is created based on color image data composed of pixels arranged in a matrix in which colors are expressed in bit rows. Combined image data is then created in which the binary image data is combined with the color image data by replacing predetermined bit values of the pixels of the color image data corresponding to the pixels with the values of the pixels of the binary image data. It is therefore possible to provide combined image data including both color image data and binary image data with the same capacity as color image data.

In the image creation device as described above, the combined image data creation unit is preferably configured to use the value of each of the binary pixels of the binary image data to replace a value of a lower bit of a predetermined color of the corresponding one of the pixels of the color image data to create the combined image data. The difference in color between the combined image data and the original color image data can then be reduced more than when a value of a bit other than the lower bit is replaced. In this case, the color image data is composed of pixels arranged in a matrix wherein the three colors RGB are expressed in a bit row, and the predetermined color may be B. In the color image data expressed by the three colors RGB, since the color B appears duller to the naked eye than R and G, the visible difference in color between the combined image data and the original color image data can be reduced more than when the value of a lower bit of R or G is replaced.

In the image creation device as described above, the pixels of the color image data are preferably arranged in a matrix, the binary pixels of the binary image data are preferably arranged in the matrix, the combined image data creation unit is preferably configured to perform replacement such that the lower bit of the predetermined color of the corresponding one of the pixels of the color image data is to be replaced, and the replacement begins with one of the pixels located in a top left of the matrix of the color image data and proceeds toward one of the pixels located in a bottom right, and the predetermined color to be replaced is preferably varied sequentially. Since the lower bit of the colors to be replaced varies sequentially beginning with the pixel located in the top left of the matrix of the color image data and proceeding toward the pixel located in the bottom right, the visible difference in color between the combined image data and the original color image data can be reduced more than when the lower bit of the same color is always to be replaced.

An image creation device according to a second aspect is the image creation device according to the first aspect, wherein the binary image data creation unit is preferably configured to create, as the binary image data, same-resolution binary image data having a resolution that is the same as that of the color image data, and to create low-resolution binary image data made of binary pixels arranged in a matrix of a lower resolution than the color image data by establishing a value of one of the binary pixels of the low-resolution binary image data based on values of the bit rows of colors of a plurality of the pixels of the color image data, and the combined image data creation unit is preferably configured to use a value of each of the pixels of the same-resolution binary image data to replace a value of a predetermined bit of a corresponding one of the pixels of the color image data, and to use a value of each of the binary pixels of the low-resolution binary image data to replace a value of a bit of each of corresponding ones of the pixels of the color image data other than the predetermined bit replaced by using the same-resolution binary image data. Therefore, it is possible to provide combined image data including three types of data; color image data, low-resolution binary image data, and high-resolution binary image data, with the same capacity of the color image data. When binary image data is created through a method of establishing the value of a single pixel based on the value of a bit row of the colors of a plurality of pixels of the color image data, the image obtained by extracting same-resolution binary image data from the combined image data and reducing the resolution is a grainier image in comparison to that of low-resolution binary image data extracted from the combined image data. Therefore, creating same-resolution binary image data and low-resolution binary image data in advance to create combined image data is highly significant. Error diffusion and systematic dithering are possible examples of the method for establishing the value of a single pixel based on the value of a bit row of the colors of a plurality of pixels of color image data.

A transmitting device according to the first aspect of the present invention includes a receiving unit connected to the image creation device as described above to receive the combined image data from the image creation device, a communication unit and a control unit. The communication unit is configured and arranged to send information to, and to receive information from, a counterpart device via a communication line. The control unit is configured to receive from the counterpart device, via the communication unit, capability information indicating a type of image data that can be received by the counterpart device after the combined image data has been received by the receiving unit. The control unit is further configured to transmit the combined image data to the counterpart device via the communication unit when the capability information indicates that the color image data can be received, and to transmit to the counterpart device, via the communication unit, the binary image data extracted from the combined image data when the capability information indicates that the color image data cannot be received but the binary image data can be received. Therefore, either the combined image data or the binary image data extracted from the combined image data can be appropriately transmitted to the counterpart device in accordance with the type of image data that can be received by the other device.

A transmitting device according to the first aspect of the present invention includes a receiving unit connected to the image creation device as described above to receive the combined image data from the image creation device, a communication unit and a control unit. The communication unit is configured and arranged to send information to, and to receive information from, a counterpart device via a communication line. The control unit is configured to receive from the counterpart device, via the communication unit, capability information indicating a type of image data that can be received by the counterpart device after the combined image data has been received by the receiving unit. The control unit is further configured to transmit the combined image data to the counterpart device via the communication unit when the capability information indicates that the color image data can be received, to transmit to the counterpart device, via the communication unit, the same-resolution binary image data extracted from the combined image data when the capability information indicates that the color image data cannot be received but the binary image data can be received and a speed of communication between the counterpart device and the communication unit is equal to or greater than a predetermined threshold, and to transmit to the counterpart device, via the communication unit, the low-resolution binary image data extracted from the combined image data when the capability information indicates that the color image data cannot be received but the binary image data can be received and the speed of communication between the counterpart device and the communication unit is less than the predetermined threshold. Therefore, either the combined image data, the same-resolution binary image data extracted from the combined image data, or the low-resolution binary image data extracted from the combined image data can be appropriately transmitted to the other device in accordance with the type of image data that can be received by the other device and the communication speed.

An image-transmitting system according to another aspect includes any of the image creation devices according to the first aspect described above and the transmitting device according to the first aspect described above. According to this image-transmitting system, the effects achieved are the same as those achieved by any of the image creation devices according to the first aspect described above or those achieved by the transmitting device according to the first aspect described above.

An image-transmitting system according to another aspect includes any of the image creation devices according to the second aspect described above and the transmitting device according to the second aspect described above. According to this image-transmitting system, the effects achieved are the same as those achieved by any of the image creation devices according to the second aspect described above or those achieved by the transmitting device according to the second aspect described above.

A non-transitory computer-readable storage medium according to one aspect stores a program for causing a computer to function as the image creation device as described above. This program may be recorded on a recording medium (e.g. a hard disk, a ROM, an FD, a CD, a DVD, or the like) that can be read by a computer, the program may be sent from one computer to another via a transfer medium (the Internet, a LAN, or another communication network), or the program may be exchanged in any other format. If this program is run on a computer, the computer functions as the image creation device of the present invention in any of the above-described aspects, and the same operational effects as those of the image creation device of the present invention are therefore achieved.

A non-transitory computer-readable storage medium according to one aspect stores a program for causing a computer to function as the transmitting device as described above. If this program is run on a computer, the computer functions as the transmitting device of the present invention in any of the above-described aspects, and the same operational effects as those of the transmitting device of the present invention are therefore achieved.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
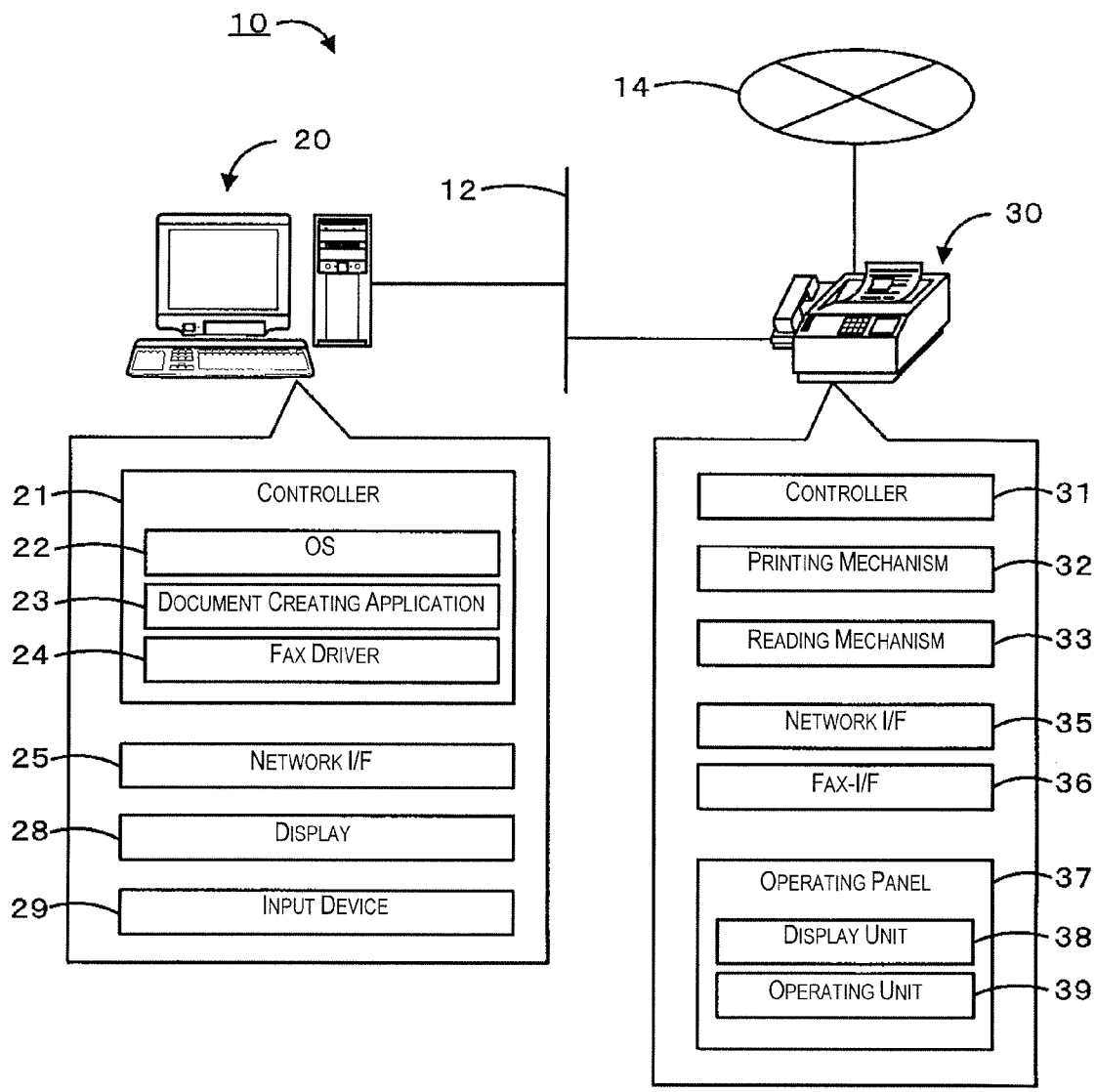
FIG. 1 is a configuration diagram showing an outline of the configuration of a FAX system 10.

An embodiment of the present invention will now be described with reference to the accompanying drawings. FIG. 1 is a configuration diagram showing an outline of the configuration of a FAX system 10 of the present invention. The FAX system 10 of the present embodiment comprises a user PC 20 configured as a general-purpose computer; a multifunction printer (MFP) 30 having the functions of a printer, a copier, a scanner, and a FAX; and an LAN 12 connecting the two. The user PC 20 is not limited to one; two or more may be included.

The user PC 20 comprises a controller 21 for controlling the user PC 20, a network interface (I/F) 25 capable of sending and receiving signals to and from devices connected to the LAN 12, a display 28 for displaying various information, and a keyboard, mouse, or another input device 29 with which the user inputs various commands. The controller 21 is configured from a CPU, a ROM, a RAM, and a hard disk (not shown). The controller 21 comprises an operating system (OS) 22, a document creating application 23, and a FAX driver 24. The OS 22 is used to manage the actions of the entire user PC 20. The document creating application 23 has the functions of a word processor, such as creating and compiling document files containing documents and images. The document creating application 23 issues print commands which cause the MFP 30 to print document files via a printer driver (not shown), and FAX transmission commands which cause the MFP 30 to transmit document files by FAX via the FAX driver 24. The FAX driver 24 has the function of receiving FAX transmission commands and mediating the sending and receiving of data including the FAX address and transmission content between the user PC 20 and the MFP 30.

The MFP 30 comprises a controller 31 for controlling the MFP 30, a printing mechanism 32 for printing images on recording paper, a reading mechanism 33 for reading images on the recording paper, a network interface (I/F) 35 capable of sending and receiving signals to and from devices connected to the LAN 12, a FAX interface (FAX-I/F) 36 capable of sending and receiving signals to and from a FAX machine (not shown) connected to a telephone line 14, and an operating panel 37 whereby the user inputs various commands. The controller 31 is configured from a CPU, a ROM, and a RAM. The printing mechanism 32 is configured as a full-color electronic photograph printing device which employs a single photoreceptor system and an intermediate transfer system, and is used to develop electrostatic latent images of the images of each color separated into the four colors cyan (C), magenta (M), yellow (Y), and black (K) as toner images, and also to transfer and heat-deposit the developed toner images onto the recording paper. The reading mechanism 33 is configured as a so-called flatbed scanner which separates reflected light into the colors red (R), green (G), and blue (B) by a line image sensor after the reflected light has been radiated onto the recording paper placed on a glass surface, and uses the separated colors as scan data. The operating panel 37 is a device for inputting various commands to the MFP 30, and is provided with a display unit 38 which is a liquid-crystal display for displaying characters and pictures corresponding to various commands, and an operating unit 39 which includes a cursor key, a select button, and other components, and which inputs various operations. The MFP 30 has the function of a G3 FAX for sending and receiving image data to the FAX machine connected to the telephone line 14 through the T.30 system standardized by ITU-T (International Telecommunication Union Telecommunication Standardization Sector), which is one FAX protocol. The MFP 30 is also capable of transmitting scan data read by the reading mechanism 33 to the FAX machine, as well as transmitting image data received from the user PC 20 via the LAN 12 to the FAX machine.

Figure 2:
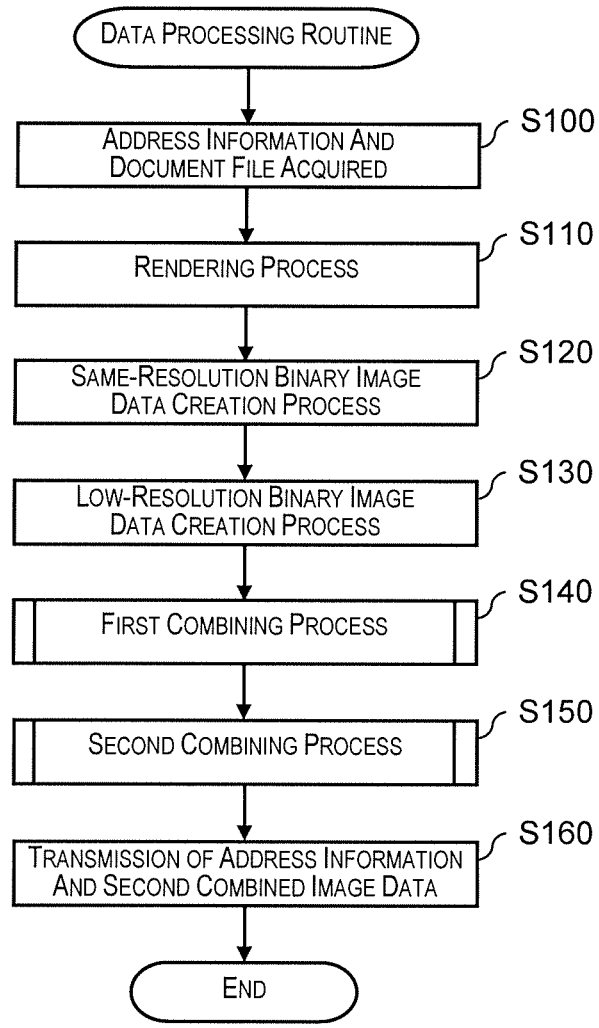
FIG. 2 is a flowchart showing an example of the data processing routine.

The following is a description of the action of the FAX system 10 of the so-configured present embodiment, and particularly of the action when image data to be transmitted as content is transmitted to the FAX machine (not shown) connected to the telephone line 14 from the user PC 20 via the MFP 30. There is first given a description of the action of the user PC 20 converting a document file as the transmitted content into the data format used by the MFP 30 and transmitting the file to the MFP 30. FIG. 2 is a flowchart showing an example of the data processing routine executed by the controller 21 of the user PC 20. This routine is executed while the document creating application 23 is running, when the user instructs the user PC 20 via the input device 29 to transmit the specified document file to the FAX machine via the MFP 30.

When this data processing routine is executed, the document creating application 23 first acquires the address information of the FAX transmission and the document file to be transmitted (step S100). The acquiring of the address information is performed by a FAX transmission setting screen (not shown) being displayed on the display 28, and the FAX number of the FAX machine receiving the transmission being inputted or selected by the user via the input device 29, for example. The acquiring of the document file to be transmitted is performed by the user acquiring the document file currently complied by the document creating application 23, for example.

When the document creating application 23 performs the process of step S100, the FAX driver 24 performs a rendering process of converting one page worth of data from the document file acquired by the document creating application 23 into color image data (step S110). The color image data is described here. The color image data is composed of a plurality of pixels arranged in a height/width matrix. The colors of the pixels are expressed by the three colors RGB being expressed as bit row values (256 gradations from 0 to 256) in 8 bits, and the positions of the pixels on the matrix are expressed by coordinates (X, Y), X denoting the position in the width direction and Y denoting the position in the height direction. In the present embodiment, this color image data is in the size A4, wherein the resolution is 200 dpi width by 200 dpi height and the matrix is a width of 1654 pixels by a height of 2339 pixels.

Next, the FAX driver 24 creates same-resolution binary image data, which is binary image data having the same resolution as the color image data (step S120). The binary image data is composed of a plurality of pixels arranged in a height by width matrix similar to the color image data, and the positions of the pixels in the matrix are expressed as coordinates (x1, y1) representing position. The pixels of the binary image data are binary pixels whose color is expressed in one bit, either a value of 0 denoting white or a value of 1 denoting black. The binary image data can be created by creating grayscale image data from the color image data by converting the RGB values (8×3 bits) of the pixels to grayscale values (8-bit gradation values) according to formula (1), and subjecting this image data to error diffusion or dithering, for example. Error diffusion involves comparing magnitude between the grayscale value of the target pixel in the grayscale image data and a predetermined threshold, binarizing the color of the pixel to white and black, and diffusing the difference between the binarized value and the original grayscale value, which is the error, at a constant ratio to unprocessed pixels surrounding the target pixel. When the pixels are processed by error diffusion starting at the top left corner pixel in the matrix and moving sequentially one pixel at a time from the left to right and from top to bottom toward the bottom right corner pixel, the unprocessed pixels include a total of four pixels, which are those right-adjacent to the target, diagonally left and below, directly below, and diagonally right and below. Dithering involves binarizing the colors of the pixels to white and black by a magnitude comparison between a threshold provided by a dither matrix set up in advance and the grayscale values of the pixels.

$$A=0.30\times R+0.59\times G+0.11\times B \qquad (1)$$

(a is a Grayscale Value, Rgb are Gradation Values of the Respective Colors)

Next, the FAX driver 24 creates low-resolution binary image data, which is binary image data of a lower resolution than the color image data (step S130). In the present embodiment, the resolution of the low-resolution binary image data is 100 dpi×100 dpi. The user may be allowed to specify the resolution of the low-resolution binary image data. The low-resolution binary image data is created as follows. First, pixels are culled from the grayscale image data created from the color image data in the process of step S120 to create low-resolution grayscale image data in accordance with the ratio between the color image data resolution and the low-resolution binary image data resolution. Low-resolution binary image data is then created by performing the above-described error diffusion or dithering on the low-resolution grayscale image data. The resolution of the low-resolution binary image data is half of the resolution of the color image data in both height and width, and the matrix of the low-resolution binary image data is therefore 827 pixels in width by 1170 pixels in height.

When the process of step S130 is performed, the FAX driver 24 performs a first combining process (step S140) for creating first combined image data in which the same-resolution binary image data created in step S120 is combined with color image data, and then performs a second combining process (step S150) for creating second combined image data in which the low-resolution binary image data is combined with first combined image data.

Figure 3:
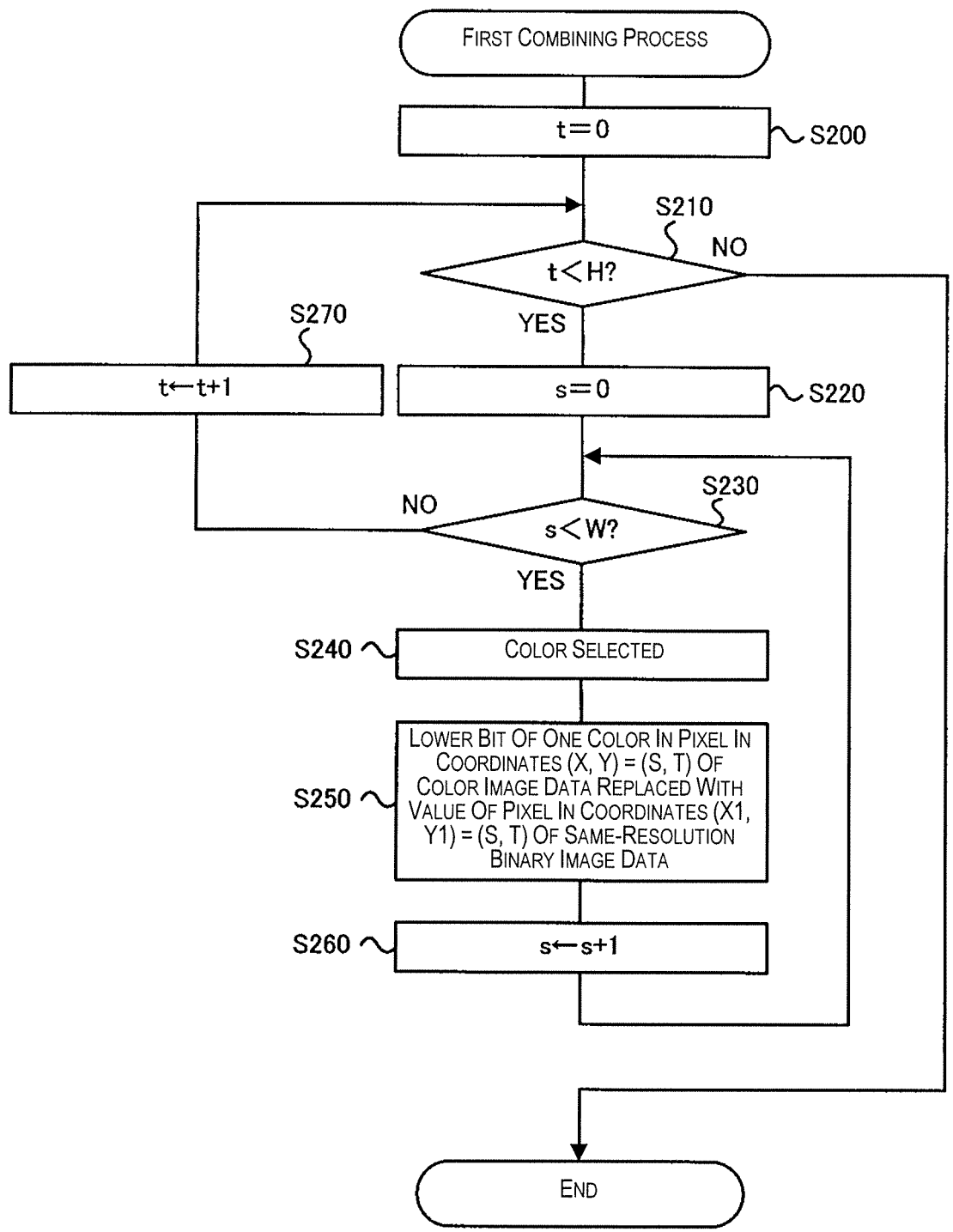
FIG. 3 is a flowchart showing an example of the first combining process.
Figure 4:
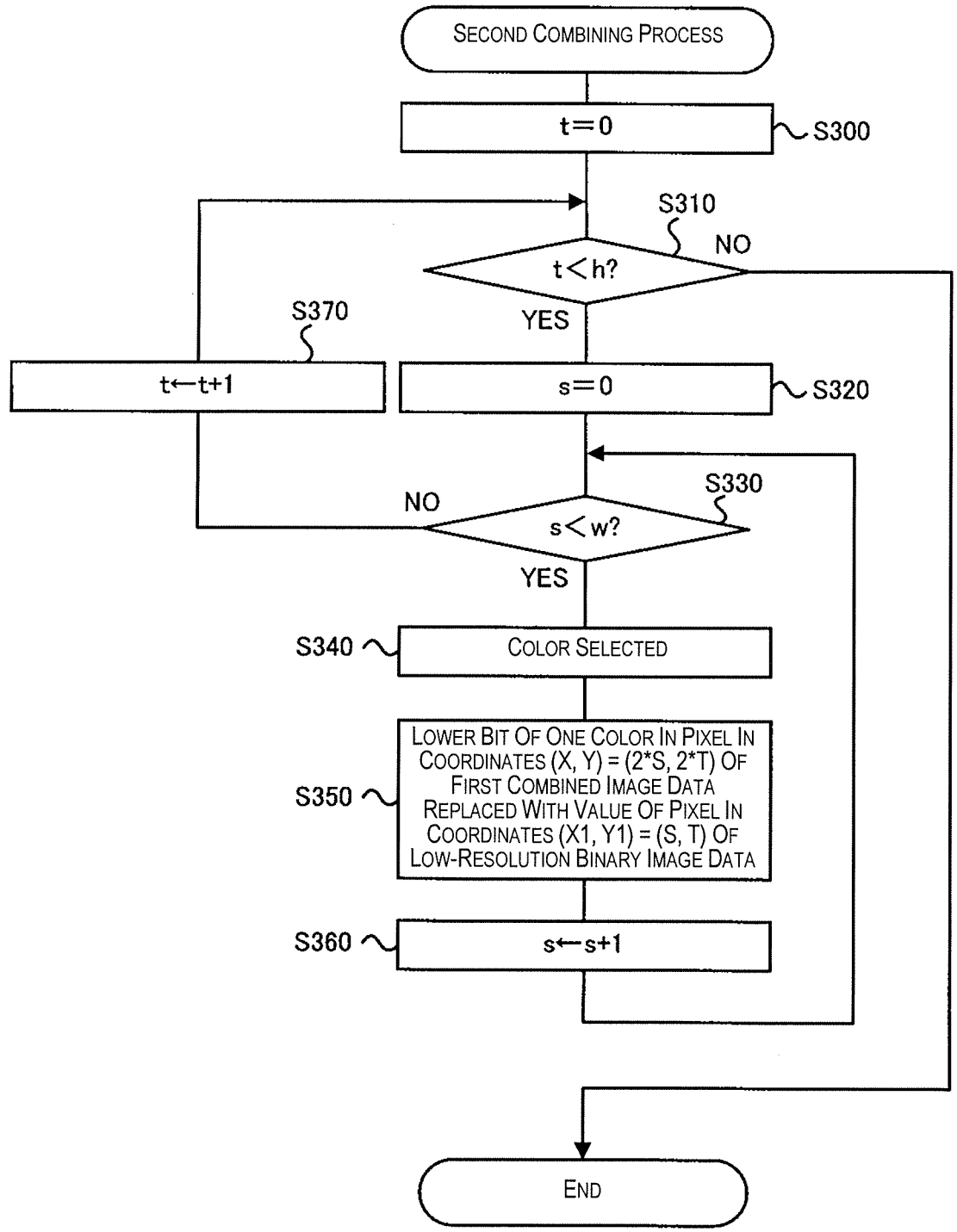
FIG. 4 is a flowchart showing an example of the second combining process.

The description of the data processing routine will be interrupted here, and the first combining process and second combining process will be described. FIG. 3 is a flowchart showing an example of the first combining process, and FIG. 4 is a flowchart showing an example of the second combining process.

First, the first combining process will be described. When this process is executed, the FAX driver 24 first initializes a variable t to a value of 0 (step S200) and determines whether or not the variable t is less than a height pixel number H (step S210). The value of the height pixel number H is set to a value of 2339, which is the height pixel number of the same-resolution binary image data described above. When an affirmative determination is made in step S210, a variable s is initialized to a value of 0 (step S220), and a determination is made as to whether or not the variable s is less than a width pixel number W (step S230). The value of the width pixel number W is set to a value of 1654, which is the width pixel number of the same-resolution binary image data described above. When an affirmative determination is made in step S230, any one color is selected from within a pixel of the color image data (step S240). This process involves selecting any one of the colors RGB from within a pixel of the color image data, and the colors are selected in the sequence R→G→B→R, etc. every time step S240 is executed.

The FAX driver 24 then replaces the value of a lower bit of the color selected in step S240 in the pixel in the position of the color image data coordinates (X, Y)=(s, t) with the value of a binary pixel in the position of the coordinates (x1, y1)=(s, t) of the same-resolution binary image data created in step S120 (step S250). The variable s is then lowered by one increment (step S260), the sequence returns to step S230, and the process of steps S230 to S260 is repeated until a negative determination is made in step S230. When a negative determination is made in step S230, the variable t is lowered by one increment (step S270), the sequence returns to step S210, and the process of steps S210 to S270 is repeated until a negative determination is made in step S210. When a negative determination is made in step S210, the first combining process is ended.

Figure 5A:
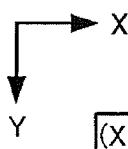
FIGS. 5A to 5C are explanatory charts showing details of the first combining process.
Figure 5B:
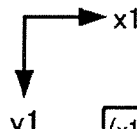
Figure 5C:
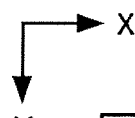

FIGS. 5A to 5C show details of the first combining process. FIG. 5A shows color image data, FIG. 5B shows same-resolution binary image data created from this color image data through the process of step S120, and FIG. 5C shows first combined image data obtained by combining the two through the first combining process. When the first combining process is initiated, after steps S200 to S230 have been executed, the color R is selected in the subsequently executed step S240. Since the variables s, t are initialized to values of 0 in steps S220 and 200 respectively, in step S250, the lower bit value of the color R in the pixel in the position of the coordinates (X, Y)=(0, 0) of the color image data is replaced with the value of the binary pixel in the position of the coordinates (x1, y1)=(0, 0) of the same-resolution binary image data. The value of the binary pixel in the position of the coordinates (x1, y1)=(0, 0) of the same-resolution binary image data is a value of 0 as shown in FIG. 5B. In the pixel in the position of the coordinates (X, Y)=(0, 0) of the color image data as shown in FIG. 5A, the color R has a value of 255, and the lower bit of the color R has a value of 1. Therefore, this lower bit is replaced with a value of 0 in step S250. As a result, as shown in FIG. 5C, the value is 254 for the color R in the pixel in the position of the coordinates (X, Y)=(0, 0) of the created first combined image data. Similarly, the lower bit value of the color G in the pixel in the position of the coordinates (X, Y)=(1, 0) of the color image data is replaced, and the lower bit value of the color B in the pixel in the position of the coordinates (X, Y)=(2, 0) of the color image data is replaced. By repeating the process of steps S210 to S270, the values of lower bits of one color in each of the pixels are sequentially replaced with binary pixel values of the same-resolution binary image data while the colors being replaced are varied in sequence, and first combined image data is created.

Next, the second combining process of FIG. 4 will be described. When this process is executed, the FAX driver 24 first initializes the variable t to a value of 0 (step S300), and determines whether or not the variable t is less than a height pixel number h (step S310). The value of the height pixel number h is set to a value of 1170, which is the height pixel number of the low-resolution binary image data described above. When an affirmative determination is made in step S310, the variable s is initialized to a value of 0 (step S320), and a determination is made as to whether or not the variable s is less than a width pixel number w (step S330). The value of the width pixel number w is set to a value of 827, which is the width pixel number of the low-resolution binary image data described above. When an affirmative determination is made in step S330, any one color is selected from within a pixel of the color image data (step S340). This process involves selecting any one of the colors RGB from within a pixel of the color image data, and the color selected is varied every time step S340 is executed. This color selection is different from step S240 described above, and is performed as follows. First, the color whose lower bit has been replaced by the first combining process is determined in the pixel in the position of the coordinates (X, Y)=(2*s, 2*t) in the first combined image data. This makes a simple determination possible using the coordinates of the pixel. The next color following the determined color in the sequence R→G→B is then selected in step S340. This makes it possible to sequentially vary and select the color as the object of replacement without selecting a color whose bit has already been replaced in the first combining process.

Next, the FAX driver 24 replaces the value of the lower bit of the color selected in step S340 in the pixel in the position of the coordinates (X, Y)=(2*s, 2*t) of the first combined image data with the value of the binary pixel in the position of the coordinates (x2, y2)=(s, t) of the low-resolution binary image data created in step S130 (step S350). The variable s is then lowered by one increment (step S360), the sequence returns to step S330, and the process of steps S330 to S360 is repeated until a negative determination is made in step S330. When a negative determination is made in step S330, the variable t is lowered by one increment (step S370), the sequence returns to step S310, and the process of steps S310 to S370 is repeated until a negative determination is made in step S310. When a negative determination is made in step S310, the second combining process is ended.

Figure 6A:
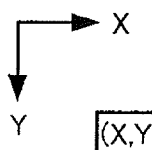
FIGS. 6A to 6C are explanatory charts showing details of the second combining process.
Figure 6B:
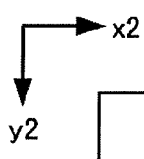
Figure 6C:
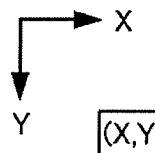

FIGS. 6A to 6C show details of the second combining process. FIG. 6A shows the first combined image data, FIG. 6B shows low-resolution binary image data created from the color image data through the process of step S130, and FIG. 6C shows second combined image data obtained by combining the two through the second combining process. When the second combining process is initiated, after steps S300 to S330 have been executed, the color G is selected in the subsequently executed step S340. Since the variables s, t are initialized to values of 0 in steps S320 and 300 respectively, in step S350, the lower bit value of the color G in the pixel in the position of the coordinates (X, Y)=(0, 0) of the first combined image data is replaced with the value 0 of the binary pixel in the position of the coordinates (x1, y1)=(0, 0) of the low-resolution binary image data. The value is thereby 254 for the color G in the pixel at (X, Y)=(0, 0) of the second combined image data shown in FIG. 6C. Similarly, the value of the lower bit of the color R in the pixel in the position of the coordinates (X, Y)=(2, 0) of the first combined image data is replaced with the value 0 of the pixel at the coordinates (x2, y2)=(1, 0) of the low-resolution binary image data. Thus, in the second combining process, the low-resolution binary image data and the first combined image data have different resolutions, and replacements are made only for the pixels of the first combined image data that are in positions equivalent to the upper left of the pixels of the low-resolution binary image data. By repeating the process of steps S310 to S370, replacements in the first combined image data are made with the values of pixels of the low-resolution binary image data, and second combined image data is created. In step S350, the object of replacement is the pixel in the position of the coordinates (X, Y)=(2*s, 2*t) of the first combined image data, but this is because the resolution ratio between the color image data and the low-resolution binary image data has a value of 2 for both height and width in the present embodiment. For example, in a case in which the resolution ratio between the color image data and the low-resolution binary image data has a value of 3 for height and a value of 1 for width, the object of replacement is preferably the pixel in the position of the coordinates (X, Y)=(s, 3*t) of the first combined image data in step S350.

Returning to the description of the data processing routine of FIG. 2, when the above-described first combining process (step S140) and second combining process (step S150) are executed, the FAX driver 24 transmits the address information and second combined image data acquired in step S100 to the MFP 30 via the LAN 12 (step S160), and ends the routine.

Figure 7:
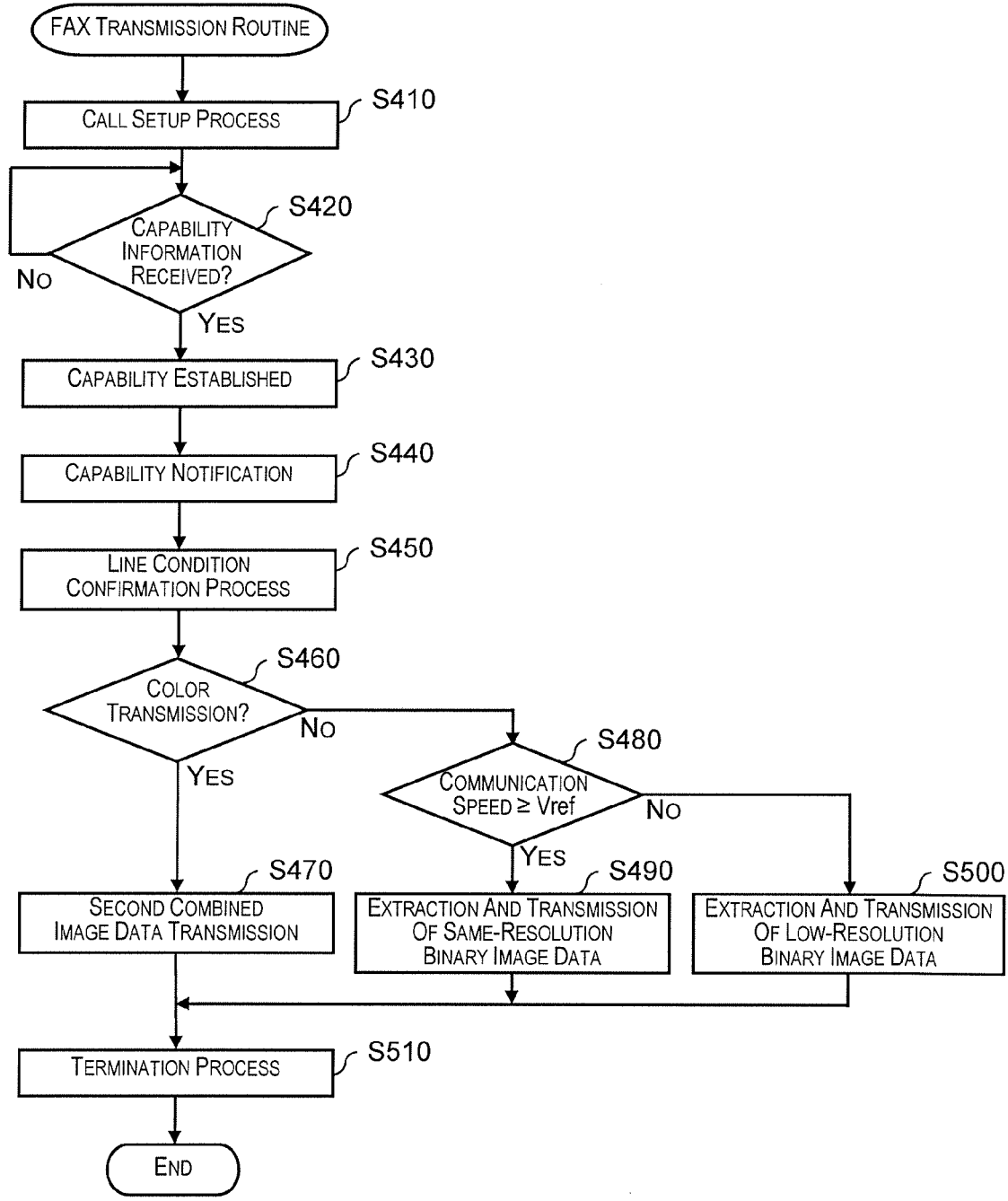
FIG. 7 is a flowchart showing an example of the FAX transmission routine.

The following is a description of the action when the MFP 30 transmits the image data transmitted from the user PC 20 to a FAX machine (not shown) via the telephone line 14. FIG. 7 is a flowchart showing an example of the FAX transmission routine executed by the controller 31 of the MFP 30. This routine is executed when the address information and the second combined image data transmitted through step S160 of the data processing routine described above has been acquired via the network I/F 35.

When this FAX transmission routine is executed, the controller 31 first performs a call setup process of establishing communication with the receiving FAX machine based on the acquired address information (step S410). The call setup process is performed as follows, for example. First, the controller transmits a call signal via the FAX-I/F 36 to the receiving FAX machine according to the acquired address information (the FAX number) and waits for a response signal from the FAX machine. When the response signal is received, the controller transmits a CNG signal notifying that a FAX transmission will be performed and waits for a CED signal which is a response to the CNG signal. When this CED signal is received via the FAX-I/F 36, the call setup process with the receiving FAX machine is complete.

Next, the controller 31 waits to receive capability information (a DIS signal) from the FAX machine via the FAX-I/F 36 (step S420), and upon reception establishes the capacity that will be used in the upcoming FAX transmission based on the received capability information (step S430). This capability information includes information indicating the maximum capacity that can be used by the receiving FAX machine. Specifically, this information indicates whether or not the color image data can be received, the maximum paper size that can be transmitted (A4, B5, etc.), the maximum communication speed that can be achieved, and other types of capacity. In step S430, based on the received capability information and the FAX transmission capacity of the MFP 30, the maximum capacity at which both can be achieved is established as the capacity that will be used in the upcoming FAX transmission. The MFP 30 is capable of transmitting color image data, the maximum paper size that can be transmitted is the size A4, and the maximum communication speed is 14.4 kb/s. Therefore, if the receiving FAX machine is capable of receiving color image data, for example, color image data is established as the type of image data that will be used in the upcoming FAX transmission, and if the receiving FAX machine is not capable of receiving color image data, binary image data is established as the type of image data that will be used in the upcoming FAX transmission. Paper size and communication speed are also established in the same manner. The controller 31 then transmits a DSC signal notifying of the established capacity via the FAX-I/F 36 and notifies the FAX machine (step S440).

Next, the controller 31 performs a line condition confirmation process of confirming the condition of the telephone line 14 (step S450). This process is performed specifically in the following manner. First, the controller transmits a training signal to the FAX machine with the communication speed notified in step S440, and waits to receive information from the FAX machine indicating whether or not the transmission was received successfully without error. When information is received indicating that an error has occurred, the communication speed is reduced, another training signal is transmitted, and this sequence is repeated until information is received indicating a successful reception free of error. When information has been received indicating that reception was successful without error, the communication speed in effect when the previous training signal was transmitted is established as the communication speed that will be used in the upcoming FAX transmission. Thus, the communication speed is established not only in view of speeds capable of communication, but also in view of the actual line condition of the telephone line 14.

When the process of step S450 is performed, the controller 31 determines whether the type of image data that will be used in the upcoming FAX transmission as established in step S430 is color image data or binary image data (step S460). When the FAX machine is capable of receiving color image data, an affirmative determination is made, and the controller 31 transmits the above-described second combined image data to the FAX machine (step S470). The FAX machine is thereby capable of receiving the second combined image data, which is color image data. For the transmission, the second combined image data is transmitted upon being encoded with JPEG compression or another format.

When the receiving FAX machine is not capable of receiving color image data, the controller 31 makes a negative determination in step S460. The controller 31 then determines whether or not the communication speed established in step S450 is equal to or greater than a predetermined threshold Vref (e.g. 7.2 kb/s) (step S480). When an affirmative determination is made, the same-resolution binary image data is extracted from the second combined image data, and the obtained same-resolution binary image data is transmitted to the receiving FAX machine (step S490). When a negative determination is made in step S480, the low-resolution binary image data is extracted from the second combined image data, and the obtained low-resolution binary image data is transmitted to the receiving FAX machine (step S500). Thus, when the communication speed is lower than the predetermined threshold, the transmission time duration of the image data tends to be longer, but it is possible to reduce the amount of data transmitted and prevent the transmission time duration from increasing by transmitting the low-resolution binary image data instead of the same-resolution binary image data. Since resolutions and pixel numbers of the above-described color image data and low-resolution binary image data are established in advance, the color selected during the pixel replacement of either step S240 or S240 described above is always the same regardless of the contents of the document file designated by the user for transmission. Therefore, it is also established in advance which color of which pixel will have its lower bit value extracted by the controller 31 in order to obtain the same-resolution binary image data or the low-resolution binary image data. The same-resolution binary image data or the low-resolution binary image data can thereby be extracted reliably from the second combined image data. When the same-resolution binary image data or the low-resolution binary image data is transmitted, it is transmitted upon being encoded by MH (Modified Huffman) compression or another format.

When the transmission of image data to the receiving FAX machine by any of the processes of steps S470, S490, and S500 is complete, a termination process is performed in which a termination signal is transmitted to the FAX machine (step S510), and the routine is ended.

The correlation between the structural elements of the present embodiment and the structural elements of the present invention will be clarified here. The FAX system 10 of the present embodiment is equivalent to the image-transmitting system of the present invention, the user PC 20 is equivalent to the image creation device, the MFP 30 is equivalent to the transmitting device, the binary image data creation unit and the combined image data creation unit are equivalent to the FAX driver 24, the network I/F 35 is equivalent to the receiving unit, the FAX-I/F 36 is equivalent to the communication unit, and the controller 31 is equivalent to the control unit.

With the user PC 20 of the present embodiment described in detail above, same-resolution binary image data and low-resolution binary image data composed of binary pixels arranged in a matrix are created based on the color image data composed of pixels arranged in a matrix, wherein the colors are expressed in bit rows. The first combining process is then performed in which the lower bit values of the predetermined color of the pixels of the color image data corresponding to the pixels of the same-resolution binary image data are replaced with the values of the pixels of the same-resolution binary image data, and the second combining process is performed in which among the pixels of the first combined image data corresponding to the pixels of the low-resolution binary image data, the lower bit values of the color other than the bits replaced in the first combining process are replaced with the values of the pixels of the low-resolution binary image data. Therefore, second combined image data including three types of data: color image data, low-resolution binary image data, and high-resolution binary image data, can be provided with the same capacity as the color image data. In steps S120 and S130, binary image data is created by error diffusion or dithering, and these methods are methods for establishing the value of a single pixel based on the values of bit rows of colors of a plurality of pixels of color image data. Therefore, the creation of same-resolution binary image data and low-resolution binary image data to create second combined image data in advance is highly significant. Furthermore, since lower bits of color image data are replaced, the difference in color between the second combined image data and the color image data can be reduced more than when the values of bits other than lower bits are replaced.

In step S240 and 340, the color whose pixels will be replaced is selected sequentially starting with the pixel located in the top left of the matrix of color image data and proceeding toward pixels located in the bottom right, and the visible color difference between the second combined image data and the color image data can therefore be reduced more than when lower bits of the same color are always the object of replacement.

With the MFP 30 of the present embodiment, either the second combined image data, the same-resolution binary image data extracted from the second combined image data, or the low-resolution binary image data extracted from the second combined image data can be appropriately transmitted to another device in accordance with the communication speed and whether or not the receiving FAX machine is capable of receiving color image data.

The present invention is in no way limited to the embodiment described above, it being apparent that the present invention can be implemented in various aspects which fall under the technological scope of the invention.

For example, in the embodiment described above, the paper size, resolution, and matrix of the color image data, the same-resolution binary image data, and the low-resolution binary image data are established in advance, but another option is for the user to be able to select or specify these settings via the input device 29. When the process of steps S120 and S130 is performed, other options are for the user to be able to select a formula instead of the aforementioned formula (1), and for the user to be able to select the method of binarization, whether it be dithering, error diffusion, or another method. In such cases, when the second combined image data is transmitted to the MFP 30 in step S160, the information that is needed for the FAX transmission routine from among these pieces of information may also be transmitted. In this case, after step S150 and before step S160, the controller 31 may display a preview of the second combined image data, the same-resolution binary image data, and the low-resolution binary image data on the input device 29 and allow the user to select whether or not the transmission of step S160 will be performed. In this case, appropriate image data reflecting the intent of the user can be transmitted by selecting a new binarization method according to the preview and executing the data processing routine again, for example.

In the embodiment described above, same-resolution binary image data and low-resolution binary image data are created and combined with color image data, but other options are to forego creating low-resolution binary image data, or to allow the user to select whether or not the data will be created. In this case, when color image data is transmitted to the MFP 30 in step S160, information indicating whether or not low-resolution binary image data is included is preferably transmitted as well.

In the embodiment described above, the controller 31 establishes in advance which colors of which pixels of the second combined image data it will extract lower bit values from in order to obtain same-resolution binary image data or low-resolution binary image data, but another option is for the controller 31 to receive from the user PC 20 information on whether same-resolution binary image data or low-resolution binary image data will be obtained if the lower bits of a certain color of a certain pixel are extracted.

In the embodiment described above, in step S250 of the first combining process, the lower bit value of a single color selected in step S240 within the pixel in the position of the coordinates (X, Y)=(s, t) of the color image data is replaced with the value of the binary pixel in the position of the coordinates (x1, y1)=(s, t) of the same-resolution binary image data, but the replacement is not limited to this option and may be made in correlation with a pixel in any position of the same-resolution binary image data and a pixel in any position of the color image data. For example, a lower bit value of a single color of a pixel in the position of the coordinates (X, Y)=(H-s, W-t) of the color image data may be replaced with a value of a binary pixel in a position of the coordinates (x1, y1)=(s, t) of the same-resolution binary image data. The pixels of color image data and of same-resolution binary image data need not have a one-to-one correspondence, such as the lower bits of R, G, and B of one pixel of color image data being replaced respectively by values of three binary pixels of same-resolution binary image data. Similarly, in step S350 of the second combining process in the embodiment described above, the value of a lower bit of a single color selected in step S340 within a pixel in the position of the coordinates (X, Y)=(2*s, 2*t) of the first combined image data is replaced with a value of a binary pixel in the position of the coordinates (x2, y2)=(s, t) of the low-resolution binary image data, but another option is to replace a lower bit value of a single color selected in step S340 within a pixel in the position of the coordinates (X, Y)=(s, t) of the first combined image data.

In the embodiment described above, the description concerned one receiving FAX machine, but the user may also instruct the user PC 20 to transmit the same document file to a plurality of FAX machines. In this case, the MFP 30 preferably executes the FAX transmission routine separately for each of the FAX machines. Since which of the second combined image data, the same-resolution binary image data, and the low-resolution binary image data that will be transmitted is established according to the capability of the receiving FAX machine or the communication speed of the receiving FAX machine, the appropriate image data can be transmitted to each FAX machine.

In the embodiment described above, the description concerned a single page of data without taking into account the number of pages of a document file being transmitted, but a document file composed of a plurality of pages may also be transmitted. In this case, the user PC 20 may create color image data for each page in the rendering process of step S110, and perform the process of steps S120 to S160 for each page. The MFP 30 may also execute steps S470, S490, and S500 for each page.

In the embodiment described above, an MFP 30 having the functions of a printer, a copier, a scanner, and a FAX performs the FAX transmission, but the MFP may also have the function of a FAX for transmitting color image data and binary image data. For example, the MFP may be a FAX-only machine.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image creation device comprising:
  a binary image data creation unit configured to create same-resolution binary image data corresponding to an entirety of color image data made of a plurality of pixels, with a color of each of the pixels of the color image data being expressed in a bit row, and create low-resolution binary image data corresponding to the entirety of the color image data, the same-resolution binary image data being binary image data made of binary pixels arranged in a matrix and having a resolution that is the same as that of the color image data, the low-resolution binary image data being binary image data made of binary pixels arranged in a matrix and having a lower resolution lower than the color image data, the same-resolution binary image data and the low-resolution binary image data being different from each other, the binary image data creation unit being further configured to create the low-resolution binary image data by establishing a value of one of the binary pixels of the low-resolution binary image data based on values of the bit rows of colors of a plurality of the pixels of the color image data; and a combined image data creation unit configured to use a value of each of the binary pixels of the same-resolution binary image data and the low-resolution binary image data to create combined image data in which the same-resolution binary image data and the low-resolution binary image data are combined with the color image data, the combined image data creation unit being further configured to use a value of each of the binary pixels of the same-resolution binary image data to replace a value of a predetermined bit of a corresponding one of the pixels of the color image data, and to use a value of each of the binary pixels of the low-resolution binary image data to replace a value of a bit of each of corresponding ones of the pixels of the color image data other than the predetermined bit replaced by using the same-resolution binary image data.

2. The image creation device according to claim 1, wherein the combined image data creation unit is configured to use the value of each of the binary pixels of the same-resolution binary image data and the low-resolution binary image data to replace a value of a lower bit of a predetermined color of the corresponding one of the pixels of the color image data to create the combined image data.

3. The image creation device according to claim 2, wherein the pixels of the color image data are arranged in a matrix, the combined image data creation unit is configured to perform replacement such that the lower bit of the predetermined color of the corresponding one of the pixels of the color image data is to be replaced, and the replacement begins with one of the pixels located in a top left of the matrix of the color image data and proceeds toward one of the pixels located in a bottom right, and the predetermined color to be replaced is varied sequentially.

4. A transmitting device comprising:
a receiving unit connected to the image creation device according to claim 1 to receive the combined image data from the image creation device;
a communication unit configured and arranged to send information to, and to receive information from, a counterpart device via a communication line; and
a control unit configured to receive from the counterpart device, via the communication unit, capability information indicating a type of image data that can be received by the counterpart device after the combined image data has been received by the receiving unit, the control unit being further configured
to transmit the combined image data to the counterpart device
via the communication unit when the capability information indicates that the color image data can be received, and
to transmit to the counterpart device, via the communication unit, the binary image data extracted from the combined image data when the capability information indicates that the color image data cannot be received but the binary image data can be received.

5. A transmitting device comprising:
a receiving unit connected to the image creation device according to claim 1 to receive the combined image data from the image creation device;
a communication unit configured and arranged to send information to, and to receive information from, a counterpart device via a communication line; and
a control unit configured to receive from the counterpart device, via the communication unit, capability information indicating a type of image data that can be received by the counterpart device after the combined image data has been received by the receiving unit, the control unit being further configured
to transmit the combined image data to the counterpart device via the communication unit when the capability information indicates that the color image data can be received,
to transmit to the counterpart device, via the communication unit, the same-resolution binary image data extracted from the combined image data when the capability information indicates that the color image data cannot be received but the binary image data can be received and a speed of communication between the counterpart device and the communication unit is equal to or greater than a predetermined threshold, and
to transmit to the counterpart device, via the communication unit, the low-resolution binary image data extracted from the combined image data when the capability information indicates that the color image data cannot be received but the binary image data can be received and the speed of communication between the counterpart device and the communication unit is less than the predetermined threshold.

6. An image-transmitting system comprising:
the transmitting device according to claim 4.

7. An image-transmitting system comprising:
the transmitting device according to claim 5.

8. A non-transitory computer-readable storage medium storing a program for causing a computer to function as the image creation device according to claim 1.

9. A non-transitory computer-readable storage medium storing a program for causing a computer to function as the transmitting device according to claim 4.

10. The image creation device according to claim 1 further comprising a color image data creation unit configured to create the color image data based on a document file to be transmitted, wherein
the binary image data creation unit creates the same-resolution binary image data and the low-resolution binary image data based on the color image data.

* * * * *